(12) United States Patent
Park et al.

(10) Patent No.: US 12,405,475 B2
(45) Date of Patent: Sep. 2, 2025

(54) WAVEGUIDE-TYPE SEE-THROUGH MAXWELLIAN NEAR-TO-EYE DISPLAY HAVING EYEBOX ENLARGED USING PIN MIRROR HOLOGRAPHIC OPTICAL ELEMENT ARRAY

(71) Applicant: INHA UNIVERSITY RESEARCH AND BUSINESS FOUNDATION, Incheon (KR)

(72) Inventors: Jae Hyeung Park, Incheon (KR); Myeongho Choi, Incheon (KR)

(73) Assignee: INHA UNIVERSITY RESEARCH AND BUSINESS FOUNDATION, Incheon (KR)

( * ) Notice: Subject to any disclaimer, the term of this patent is extended or adjusted under 35 U.S.C. 154(b) by 0 days.

(21) Appl. No.: 18/702,158

(22) PCT Filed: Feb. 17, 2022

(86) PCT No.: PCT/KR2022/002344
§ 371 (c)(1),
(2) Date: Apr. 17, 2024

(87) PCT Pub. No.: WO2023/068456
PCT Pub. Date: Apr. 27, 2023

(65) Prior Publication Data
US 2024/0411136 A1    Dec. 12, 2024

(30) Foreign Application Priority Data
Oct. 22, 2021  (KR) .......... 10-2021-0141462

(51) Int. Cl.
*G02B 27/01* (2006.01)
*F21V 8/00* (2006.01)
*G02B 5/32* (2006.01)

(52) U.S. Cl.
CPC .......... *G02B 27/0172* (2013.01); *G02B 5/32* (2013.01); *G02B 6/0035* (2013.01); *G02B 2027/0174* (2013.01)

(58) Field of Classification Search
None
See application file for complete search history.

(56) References Cited

U.S. PATENT DOCUMENTS 9,459,451 B2 * 10/2016 Saarikko ............ G02B 27/0093
10,241,332 B2 * 3/2019 Vallius ..................... G02B 6/34
(Continued)

FOREIGN PATENT DOCUMENTS

KR     1020190126408 A     11/2019
KR     1020200105687 A      9/2020
(Continued)

OTHER PUBLICATIONS

International Search Report issued in PCT/KR2022/002344 mailed Jul. 19, 2022.
Office Action issued in KR10-2021-014162 and dated Sep. 5, 2023.

*Primary Examiner* — Fred Tzeng
(74) *Attorney, Agent, or Firm* — Heslin Rothenberg Farley & Mesiti P.C.

(57) ABSTRACT

Various embodiments provide a waveguide-type see-through Maxwellian near-to eye display having an eyebox enlarged using a pin mirror holographic optical element array. According to various embodiments, the waveguide-type see-through Maxwellian near-to-eye display comprises: a waveguide; and a pin mirror holographic optical element array which is attached to the waveguide and diffracts light propagating within the waveguide toward a user.

10 Claims, 9 Drawing Sheets

(56) References Cited

U.S. PATENT DOCUMENTS

| | | | |
|---|---|---|---|
| 10,429,648 B2* | 10/2019 | Sverdrup | G02B 27/0172 |
| 10,598,938 B1* | 3/2020 | Huang | G02B 6/4214 |
| 10,712,567 B2* | 7/2020 | Georgiou | G02B 27/0101 |
| 10,838,132 B1* | 11/2020 | Calafiore | G02B 6/0015 |
| 11,175,511 B2* | 11/2021 | Chi | G02B 1/11 |
| 11,269,144 B2* | 3/2022 | Oh | G02B 5/1833 |
| 11,474,358 B2* | 10/2022 | Meitav | H04N 23/56 |
| 11,531,202 B2* | 12/2022 | Bohn | G02B 27/4205 |
| 11,666,825 B2* | 6/2023 | Delamont | G06T 19/006 |
| | | | 463/32 |
| 11,709,358 B2* | 7/2023 | Yang | G02B 27/0172 |
| | | | 359/630 |
| 11,774,758 B2* | 10/2023 | Yang | G02B 6/0016 |
| | | | 359/34 |
| 2016/0077338 A1* | 3/2016 | Robbins | G02B 27/4205 |
| | | | 359/489.08 |
| 2018/0246330 A1* | 8/2018 | Fattal | G02B 6/0038 |
| 2019/0094549 A1* | 3/2019 | Nicholson | G02B 6/00 |
| 2019/0187474 A1* | 6/2019 | Bhargava | G02B 27/0955 |
| 2019/0204600 A1* | 7/2019 | Ha | G02B 27/017 |
| 2019/0317270 A1* | 10/2019 | Tammela | G02B 6/0026 |
| 2020/0183169 A1* | 6/2020 | Peng | G02B 6/0055 |
| 2020/0271936 A1* | 8/2020 | Leibovici | G03H 1/0244 |
| 2022/0260836 A1* | 8/2022 | Chi | G02B 27/0172 |
| 2022/0413302 A1* | 12/2022 | Meitav | G02B 27/0172 |

FOREIGN PATENT DOCUMENTS

| | | |
|---|---|---|
| KR | 1020210065131 A | 6/2021 |
| KR | 1020210075918 A | 6/2021 |

* cited by examiner

FIG. 9A
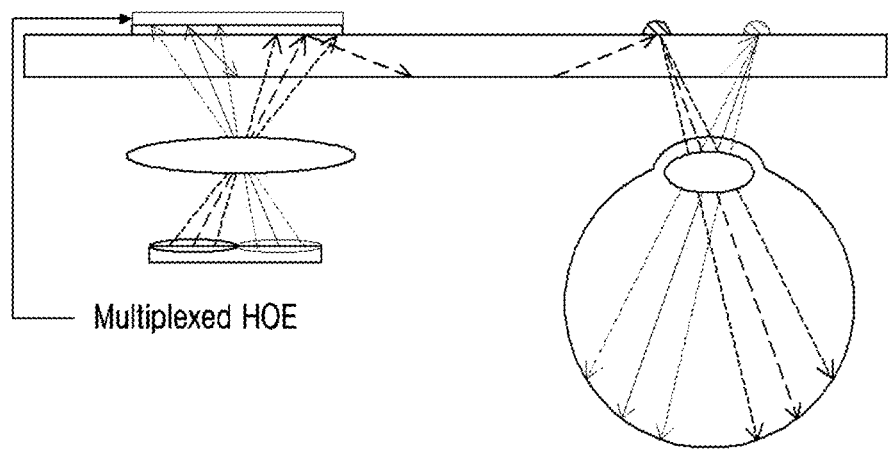
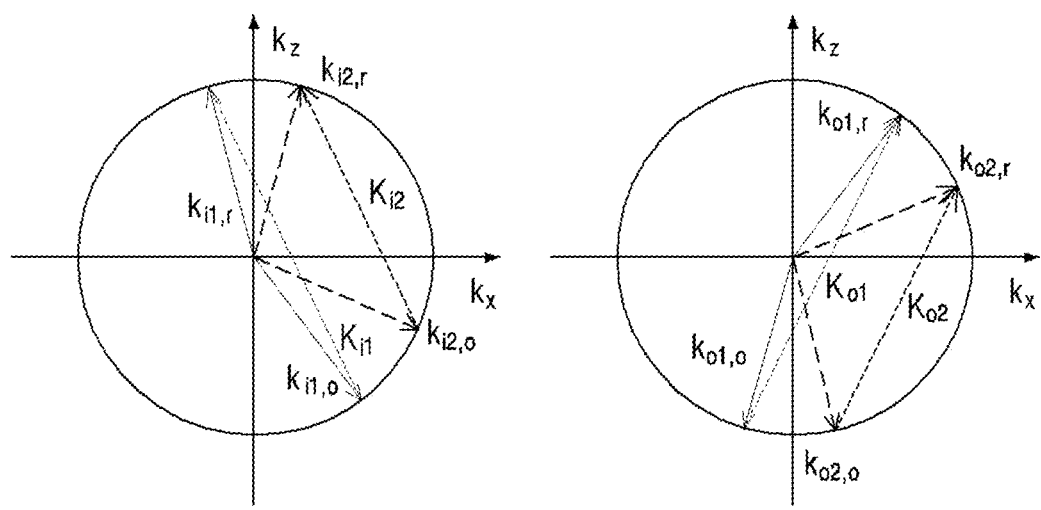
FIG. 9B	FIG. 9C

FIG. 10A
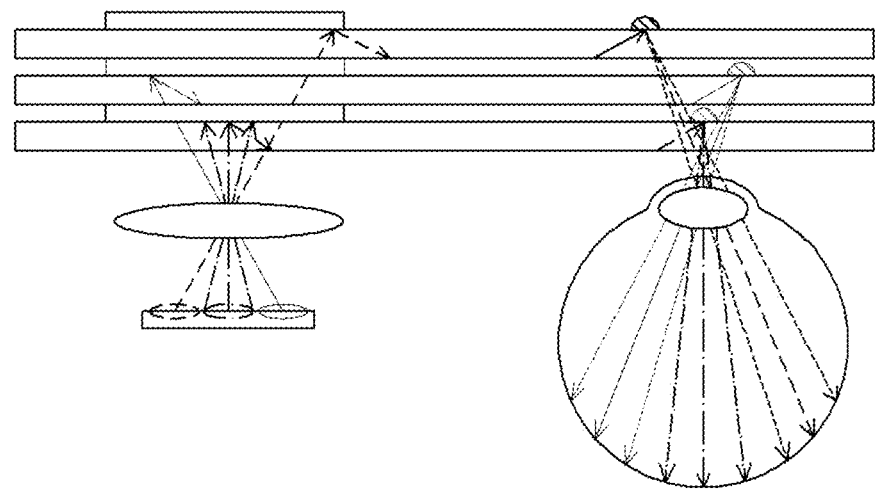
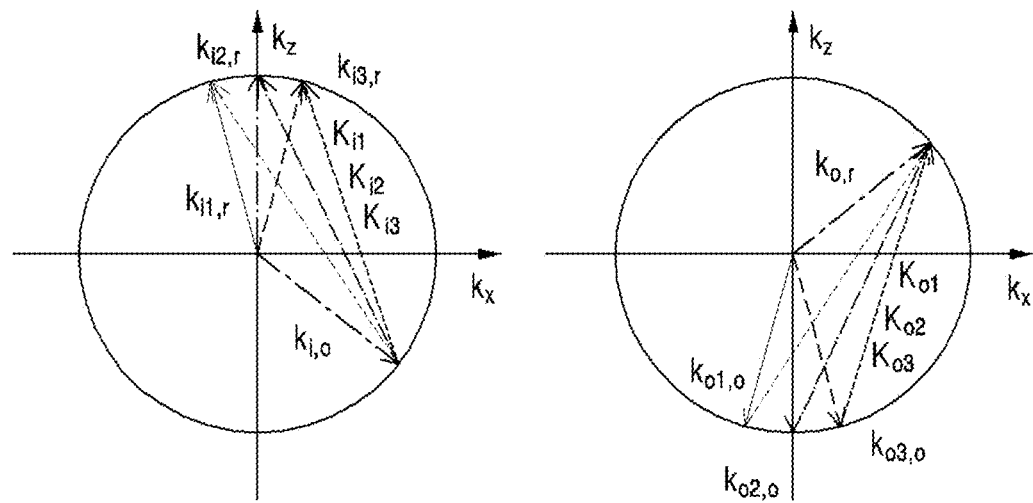
FIG. 10B　　　　　　　　FIG. 10C

WAVEGUIDE-TYPE SEE-THROUGH MAXWELLIAN NEAR-TO-EYE DISPLAY HAVING EYEBOX ENLARGED USING PIN MIRROR HOLOGRAPHIC OPTICAL ELEMENT ARRAY

TECHNICAL FIELD

The present patent relates to research conducted with the support of the National IT Planning and Evaluation Institute with funding from the government (Ministry of Science and ICT) in 2022 (2021-0-00091 (Development of real-time high-speed renderer technology for creating ultra-realistic holograms)).

CROSS REFERENCE TO RELATED APPLICATIONS

This application is a U.S. National Phase filing under 35 U.S.C. § 371 of International Application No. PCT/KR2022/002344, filed Feb. 17, 2022, and published as WO 2023/068456 A1 on Apr. 27, 2023. PCT/KR2022/002344 claims priority from Korean patent application No. 10-2021-0141462, filed Oct. 22, 2022. The entire contents of each of these prior applications are hereby incorporated herein by reference.

Various example embodiments relate to a waveguide-type see-through Maxwellian near-eye display with an enlarged eyebox using a PMHOE array.

RELATED ART

In virtual reality (VR) and augmented reality (AR) applications, a near-eye display (NED) is a main device that delivers intuitive visual information to a user. Unlike a VR NED, an AR NED needs to have an optical see-through (OST) configuration to superimpose a virtual image onto the real world. An optical combiner is a key device that enables the AR NED to have OST capability, but the use of this device makes an optical structure of the AR NED more complicated than that of the VR NED.

Various AR NEDs may be categorized by type of an embedded optical combiner. A waveguide-type NED (WNED) may have a compact form factor due to a thin waveguide and in/out-couplers fabricated with a diffractive optical element (DOE) or a holographic optical element (HOE). Since such diffraction grating-based components have high optical transparency due to angular and wavelength selectivity, the components may transmit a real scene better than other combiners. Also, by applying an exit pupil expansion (EPE) technique, small eyebox of the AR WNED may be enlarged, enhancing user's comfort when using the device. Using such features, the WNED has been actively studied and commercialized.

However, most of the conventional AR WNEDs suffer from a vergence-accommodation conflict (VAC) problem, which is a cause of user's visual discomfort. The VAC originates from an optical structure of the WNED with a single virtual image plane based on a collimated display engine.

DETAILED DESCRIPTION

Technical Subject

Various example embodiments provide a waveguide-type see-through Maxwellian near-eye display with an enlarged eyebox using a pin-mirror holographic optical element (PM-HOE) array.

Solution

A waveguide-type see-through Maxwellian near-eye display according to various example embodiments includes a waveguide and a pin-mirror holographic optical element (PMHOE) array configured to attach to the waveguide and to diffract light propagated within the waveguide toward a user.

Effect

According to various example embodiments, there is provided a waveguide-type see-through Maxwellian near-eye display with an enlarged eyebox using a pin-mirror holographic optical element (PMHOE) array and while maintaining a thin waveguide form factor.

BRIEF DESCRIPTION OF DRAWINGS

FIG. 9A-FIG. 9C schematically illustrates a Maxwellian AR NED with a multiplexed in-coupler HOE, a set of out-coupler PMHOEs, and a single waveguide according to second example embodiments.

FIG. 10A-10C schematically illustrates a Maxwellian AR NED with a multiplexed PMHOE and a multiplexed waveguide according to third example embodiments.

DETAILED DESCRIPTION

Hereinafter, various example embodiments disclosed herein are described with reference to the accompanying drawings.

Figure 1:
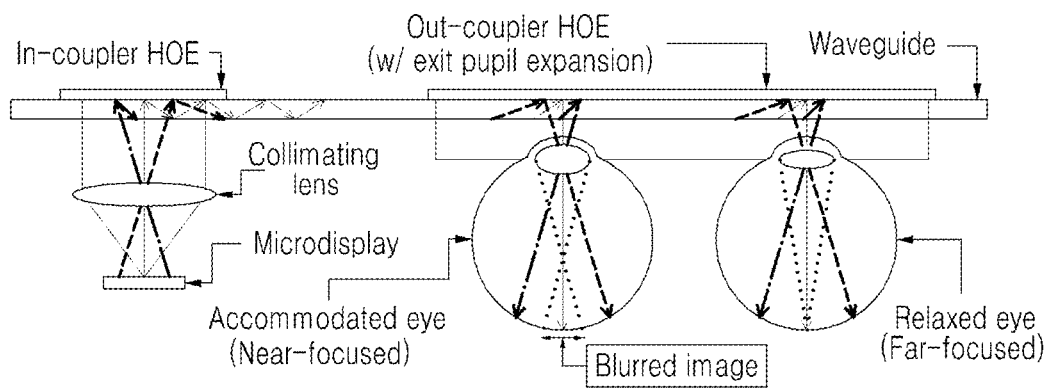
FIG. 1 schematically illustrates a conventional augmented reality waveguide-type near-eye display (AR WNED) with a holographic optical element (HOE) coupler.

FIG. 1 schematically illustrates a conventional augmented reality waveguide-type near-eye display (AR WNED) using a holographic optical element (HOE) coupler.

Referring to FIG. 1, a red-colored (-) ray bundle from a center-located pixel is collimated by a collimating lens. Then, the ray is guided into a waveguide by an in-coupler HOE that is recorded to diffract the normally incident light to an angle larger than a critical angle and the guided rays experience a total internal reflection (TIR) inside the waveguide. Meanwhile, ray bundles from different pixels, indicated with green color (-•-) and blue color (---), are diffracted to different angles by the in-coupler HOE and guided into the waveguide. Ray bundles that experience multiple total internal reflections (TIRs) inside the waveguide are diffracted toward a user by an out-coupler HOE. To observe a virtual image in this configuration, an eye crystalline lens needs to be relaxed and focused at the infinite plane. Here, if the eye focuses at a near plane, an image is blurred due to defocus. Therefore, an eye accommodation distance of an optical system is always fixed at the optical infinite plane. However, a vergence distance varies according to a three-dimensional (3D) virtual image distance that is controlled by binocular disparity. Consequently, theme is a discrepancy between the accommodation distance and the vergence distance, which causes discomfort while using the waveguide-type near-eye display (WNED).

In recent studies, various techniques are proposed to address a vergence-accommodation conflict (VAC) problem in a waveguide-based augmented reality near-eye display (AR NED). One technique is a waveguide-type augmented reality near-eye display (AR WNED) technique having dual virtual image planes with a single waveguide using a polarization-dependent lens. However, the dual virtual image planes are still insufficient to fully solve the vergence-accommodation conflict problem. To present three-dimensional (3D) virtual images with true focus cue, light field or holographic AR NED is proposed as another technique. However, most 3D near-eye displays use a relatively thick waveguide, which is referred to as a light guide herein, and also have a restricted eyebox since an exit pupil expansion (EPE) technique is not applied.

Maxwellian display or retinal projection display (RPD) is another technique that may alleviate the vergence-accommodation conflict problem. By restricting the effective pupil of the near-eye display like a pinhole camera, a virtual image with deep depth-of-field (DoF) may be displayed. The observed image is always in-focused regardless of refractive power of the user's eye lens, which helps to mitigate the discrepancy between the accommodation distance and the vergence distance. Although this technique makes a user of the near-eye display feel more comfortable, there is a limitation that the eyebox size is very small due to the restriction of the exit pupil. This interrupts the smooth immersive experience of the AR NED during rotation of the eyeball or dislocation of the device. To enlarge this tiny eyebox, one study fabricated a two-dimensional (2D) beam deflector based on polarization-dependent optical elements. Although 3×3 image observation viewpoints are successfully achieved, the overall form factor was not compact as the WNED since a bulky beam splitter was used as a combiner. Another study fabricated a lightguide-type Maxwellian AR NED with an enlarged eyebox using a multiplexed HOE working as multiple off-axis concave mirrors. To avoid blank or overlapping of the virtual image that may occur in this optical structure, still another study proposed a dynamically switchable eyebox enlarging technique using a polarization-dependent lens and a multiplexed HOE. Also, still another study proposed an eyebox extended lightguide-type Maxwellian AR NED technique using multiple independent HOEs. However, in the listed studies, a thickness of the lightguide is larger than that of usual waveguides using the EPE technique. Unlike a usual waveguide configuration using the EPE technique, main rays from all pixels in the listed studies have the same TIR angle in the lightguide and are distinguished only by their spatial positions when the rays reach an out-coupler. If the lightguide is thin such that spatially different information overlaps at a specific position, a ghost image or image duplication problem may occur. Therefore, a thin waveguide was not available in the listed studies and the EPE technique was not applicable.

Various example embodiments propose a novel eyebox extended Maxwellian AR NED, while maintaining a thin waveguide form factor. A core element of the proposed system is an out-coupler fabricated with a pin-mirror holographic optical element (PMHOE) array. The tiny size of individual PMHOE reduces the effective aperture of the system and presents a virtual image with deep DoF accordingly. A 2D array of PMHOEs extends the eyebox, enhancing user comfort and eye position tolerance.

A small mirror HOE has been reported by one study. The study introduced a reflection-type AR NED using a holographically printed free form mirror array HOE. Although the study successfully proved the Maxwellian view effect with an extended eyebox, a corresponding system has a free space projection configuration rather than a waveguide configuration. A relatively large volume is required for projecting an image onto the HOE plane and the EPE technique may not be applied. An AR NED with a pin-mirror array was also reported by a company. Although a Maxwellian display module is developed using the pin-mirror array, a lightguide is relatively thick and it is not easy to fabricate a pin-mirror-embedded lightguide.

In contrast, the proposed system is based on the waveguide configuration, achieving a thin (about 1 mm in implementation herein) form factor and a replicated eyebox. Since the PMHOE array may be simply recorded and attached to the waveguide, the proposed system has an advantage in fabrication.

Figure 2:
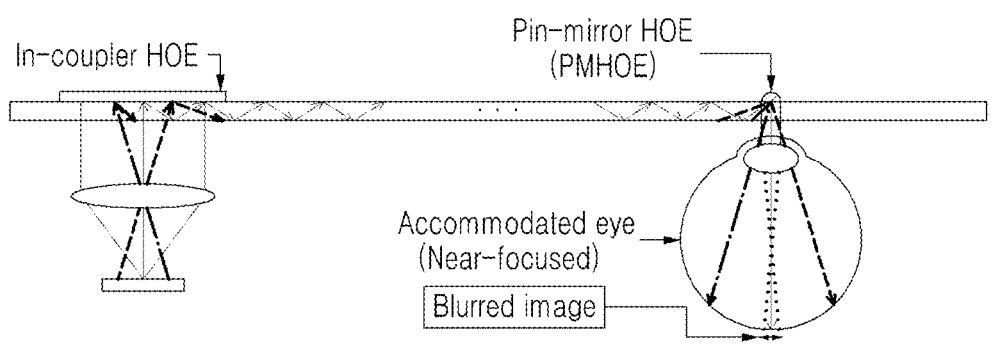
FIG. 2 schematically illustrates a Maxwellian augmented reality waveguide-type near-eye display (AR WNED) with a single pin-mirror holographic optical element (PMHOE) coupler according to first example embodiments.

FIG. 2 schematically illustrates a Maxwellian AR WNED with a single PMHOE coupler according to first example embodiments.

Referring to FIG. 2, the Maxwellian AR WNED includes a waveguide, an in-coupler HOE configured to attach to the waveguide and to guide incident light into the waveguide such that the incident light from a display propagates in the waveguide, and a pin-mirror HOE (PMHOE) configured to attach to the waveguide and to diffract light propagated in the waveguide toward a user. Unlike the conventional out-coupler HOE shown in FIG. 1, the PMHOE limits the beam waist emitted and collimated from each pixel and propagated in the waveguide and delivers the same toward the user. Since the effective exit pupil is limited due to the PMHOE, an amount of defocus in the retina plane is reduced, presenting a virtual image with deep DoF. As a result, the Maxwellian view effect of a virtual image is realized by the PMHOE.

The size of the PMHOE is an important design factor of the proposed system. To verify a suitable size, a simple simulation was conducted and a modulation transfer function (MTF) of proposed optics was estimated. The PMHOE and eye lens were assumed to be an ideal aperture and a lens, respectively. The virtual image generated by the near-eye display (NED) is assumed to be present at the infinite plane.

Figure 3:
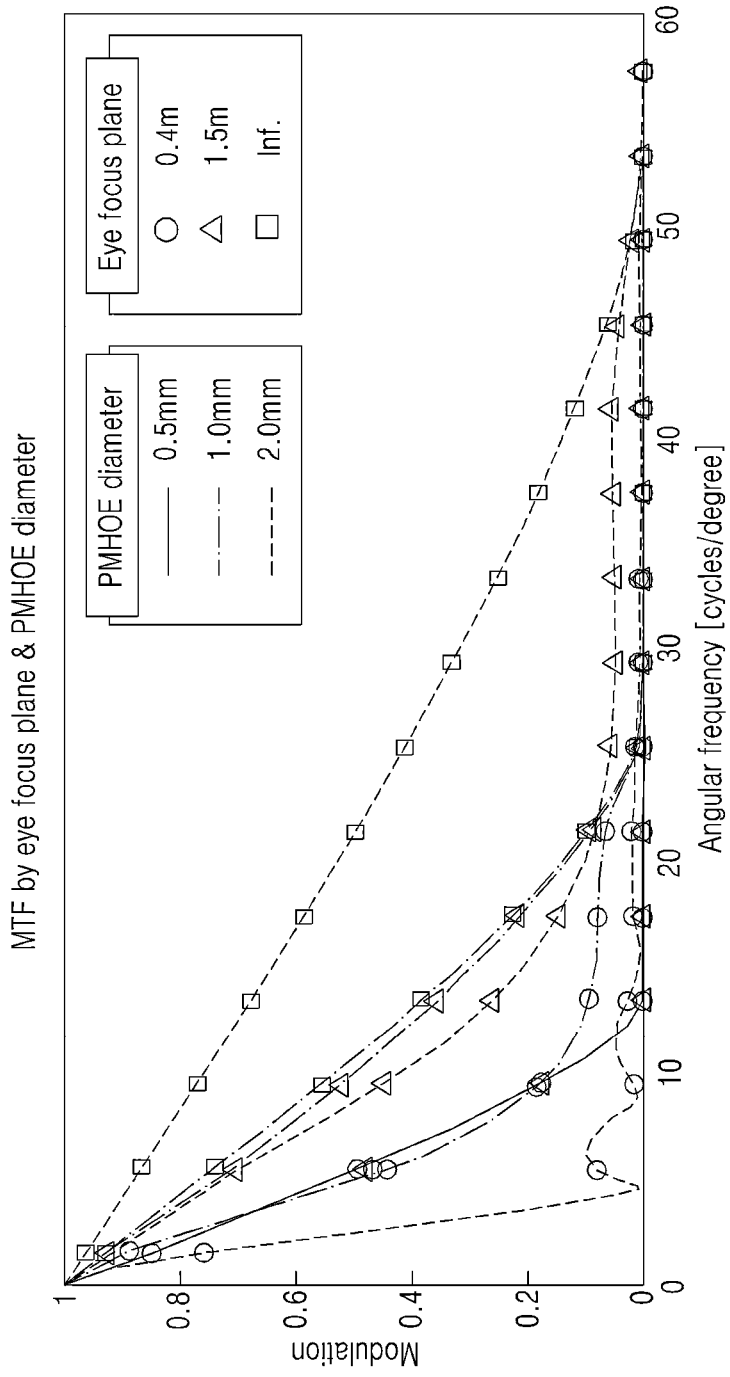
FIG. 3 is a graph showing modulation transfer functions for different PMHOE sizes and eye focus planes.

FIG. 3 illustrates modulation transfer functions (MTFs) according to different PMHOE sizes and positions on which the eye focuses.

Referring to FIG. 3, a modulation transfer function of a user eye with a PMHOE may be analyzed according to a diameter of the PMHOE and a focal length of the lens. When the eye focuses at infinity, it is obvious that a PMHOE with a large diameter has a high modulation depth (MD) for a high frequency (dashed lines, 2.0 mm diameter). This is because the larger aperture the optical system has, the better resolving power may be provided. However, when the eye focuses near 40 cm plane, the modulation depth decreases rapidly as an angular frequency increases. This represents that this system has shallow DoF, and the Maxwellian view may not be realized. A PMHOE with a small diameter (solid lines, 0.5 mm diameter) achieves the deep DoF, providing negligible modulation transfer function change for different eye focal distances. However, due to diffraction from the tiny aperture, a high frequency part above a cut-off frequency may not be expressed and the modulation transfer function is generally worse. In the case of a mid-sized PMHOE (dash-dotted lines, 1.0 mm diameter), it has at least the same or better modulation transfer function than that of a small-sized PMHOE regardless of the focal power of the eye. Although the best modulation transfer function of the mid-sized PMHOE is less than that of a large-sized PMHOE, the modulation transfer function maintains a reasonable value, 0.5 MD at 10 cpd even for the most significant defocus (eye focuses at 0.4 m). Therefore, the proposed system selects the PMHOE with the mid-sized diameter, for example, 1 mm.

Figure 4:
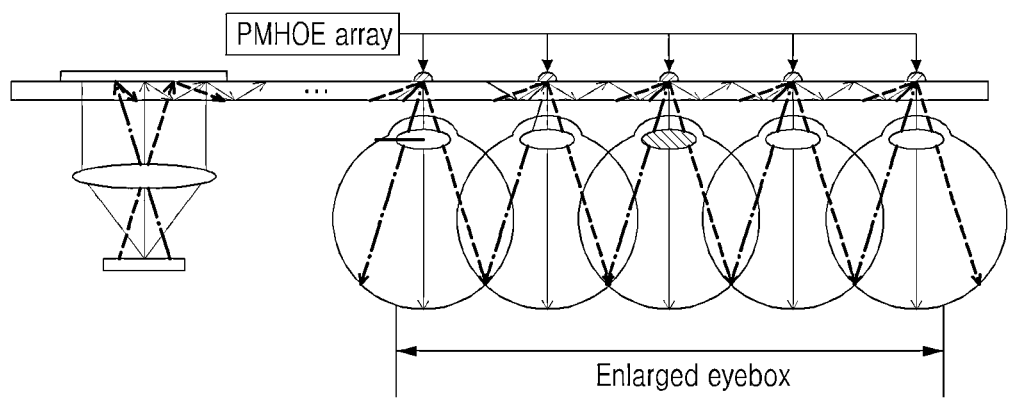
FIG. 4 schematically illustrates a Maxwellian AR WNED with an enlarged eyebox using a PMHOE array according to the first example embodiments.

A single PMHOE in the proposed system presents a virtual image with a deep DoF. However, the eyebox is limited around a lateral position of the PMHOE. To extend the overall eyebox, the proposed system uses a PMHOE array. FIG. 4 schematically illustrates a Maxwellian AR WNED with an enlarged eyebox using a PMHOE array according to the first example embodiments.

Referring to FIG. 4, the Maxwellian AR WNED includes a waveguide, an in-coupler HOE configured to attach to the waveguide and to guide incident light into the waveguide such that the incident light propagates in the waveguide, and a PMHOE array configured to attach to the waveguide and to diffract the light propagated in the waveguide toward a user. The PMHOE array includes a plurality of PMHOEs each attached to the waveguide and arranged to be separate from each other on the waveguide, and configured to realize the Maxwellian view effect. After ray bundles are diffracted by a first PMHOE, the rest of them propagate in the waveguide by total internal reflection (TIR) and are diffracted by other PMHOEs. Therefore, the PMHOE array replicates the individual eyebox and increases the overall area in which the eye may be located. It is necessary to note that the eyebox replication used in the proposed system only increases the overall eyebox area while maintaining the Maxwellian-view effect, unlike conventional exit pupil expansion (EPE) techniques. Also, it is necessary to note that the 2D replication is easily achieved by using a 2D array of PMHOEs although FIG. 4 illustrates a 1D array only for simplicity. It is another advantage of the proposed system that the 2D replication does not require additional folding HOE like the conventional 2D EPE techniques. However, if ray bundles from two or more PMHOEs enter the eye at the same time, the Maxwellian view effect may be degraded. In the proposed system, a gap between neighboring PMHOEs is designed to be about 5 mm, which is larger than the average pupil size in a bright state.

Figure 5A:
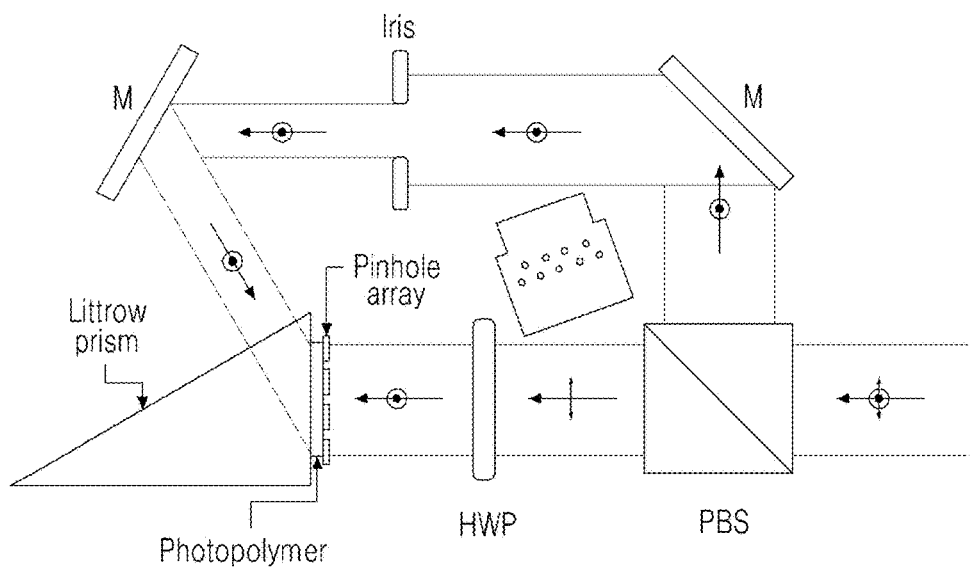
FIGS. 5A and 5B are a schematic diagram and a line drawing of an experimental setup for PMHOE array fabrication according to the first example embodiments.
Figure 5B:
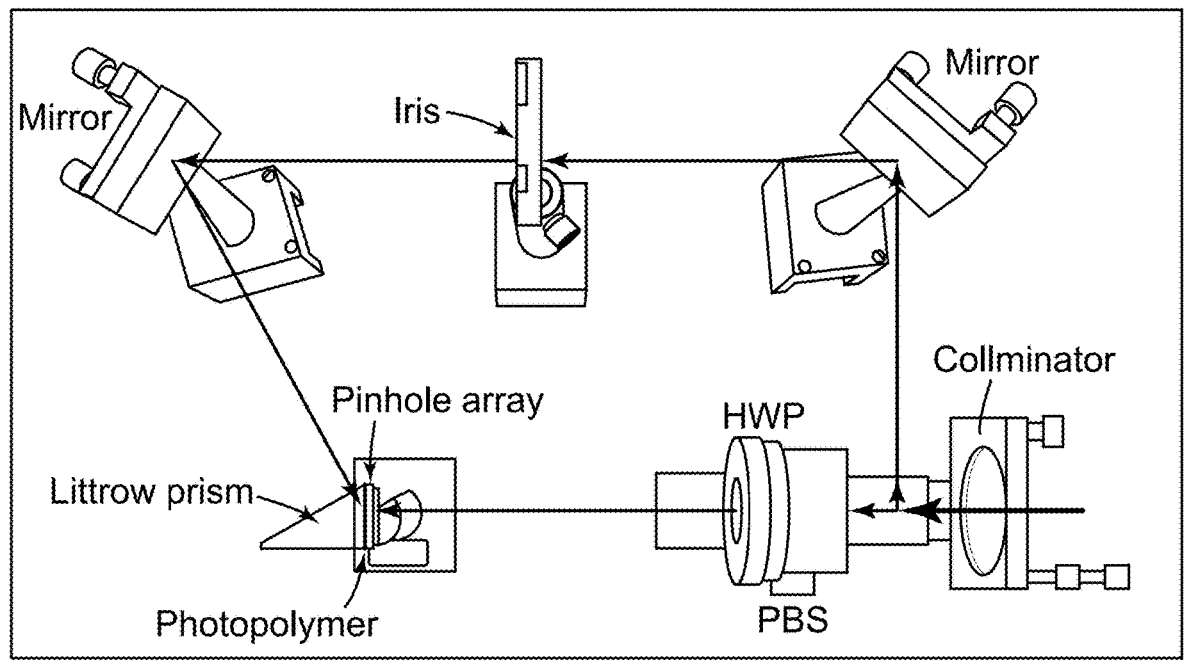

FIGS. 5A and 5B are a schematic diagram and a line drawing of an experimental setup for PMHOE array fabrication according to the first example embodiments.

Referring to FIGS. 5A and 5B, after attaching a photopolymer film (Litiholo, C-RT20) onto a Littrow prism (Edmund Optics, S/N 43-649), a 3D-printed pinhole array mask was placed in front of the photopolymer film. A wavelength of laser used for recording of an HOE was 660 nm (Cobolt, Flamenco 500 mW). After interfering with two lights on the photopolymer film and fixing the same using ultraviolet (UV) rays, a recorded out-coupler was detached and attached to a waveguide with a thickness of 1 mm. Due to symmetry between two couplers, a recording process of an in-coupler was performed in the same setup except for the presence of a pinhole array mask.

Figures 6A, 6B, 6C:
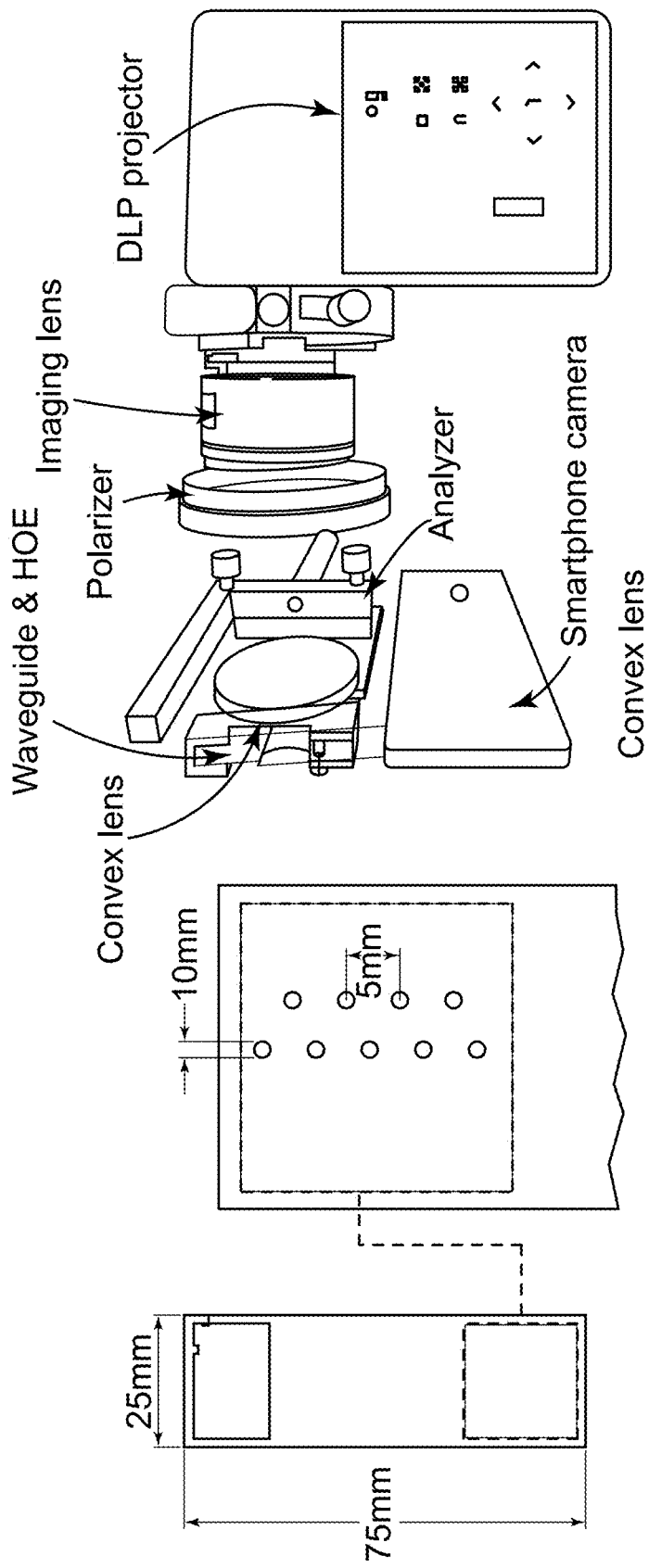
FIGS. 6A-6C are line drawings illustrating an example of a waveguide-type see-through Maxwellian NED with an enlarged eyebox using a PMHOE array according to the first example embodiments.

FIGS. 6A-6C are line drawings illustrating an example of a waveguide-type see-through Maxwellian NED with an enlarged eyebox using a PMHOE array according to the first example embodiments. FIG. 6A, shows a waveguide-type see-through Maxwellian NED with an enlarged eyebox using a PMHOE array, FIG. 6B shows enlargement of the PMHOE array of FIG. 6A, and FIG. 6C shows an experimental setup for observing augmented reality (AR) implemented using FIG. 6A.

Referring to FIG. 6A, the waveguide type see-through Maxwellian NED with the enlarged eyebox is implemented using the PMHOE array. The overall size is about 25 mm×75 mm with a thickness of 1.1 mm. As shown in FIG. 6B, the PMHOE array includes a plurality of PMHOEs. In FIG. 6B, although only nine PMHOEs are recorded, more PMHOEs may be recorded depending on the pinhole array mask used for recording. To observe an augmented reality virtual image using the waveguide-type see-through Maxwellian NED, the experimental setup was made as shown in FIG. 6C. A digital light processing (DLP) projector (Qumi, Q38) is used as a display. To expand a collimated beam diameter of each pixel from the projector, a 4-f relay system with lenses having different focal lengths was used. A smartphone camera in the eyebox area was used to capture experimental results of the implemented system.

Figure 7A:
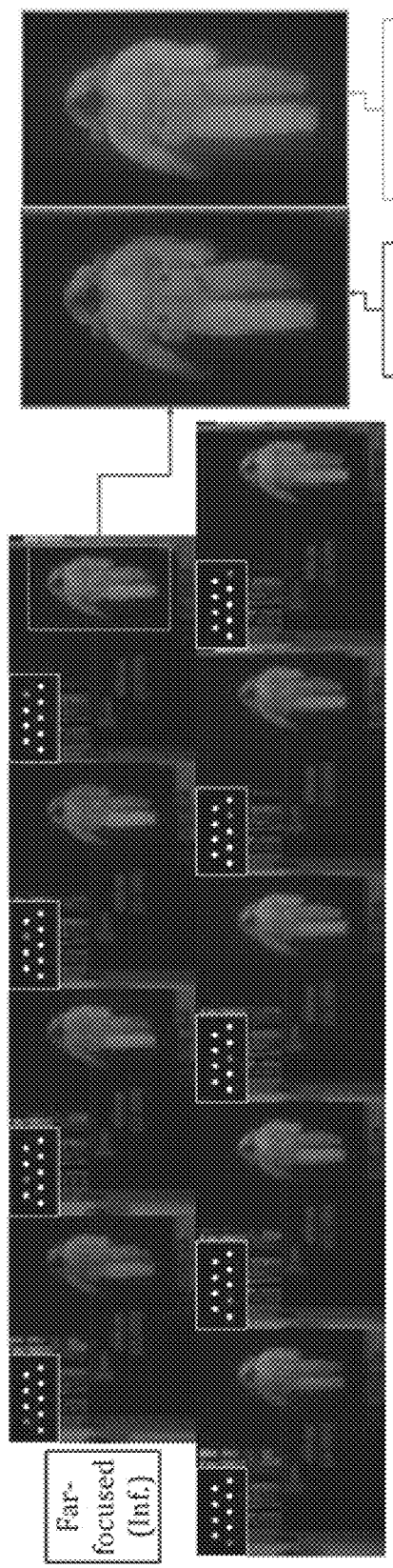
FIGS. 7A and 7B are images showing experimental results observed using the Maxwellian NED of FIGS. 6A-6C.
Figure 7B:
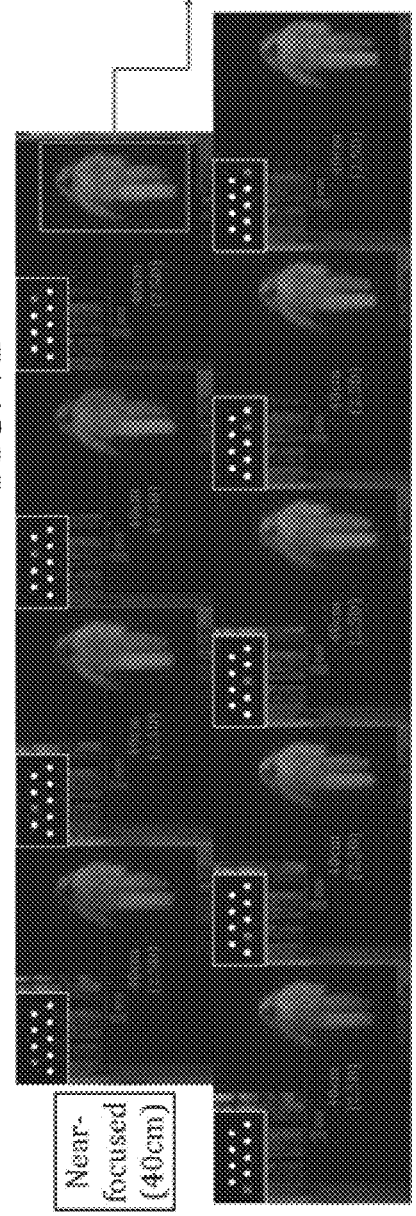

FIGS. 7A and 7B are images showing experimental results observed using FIGS. 6A-6C. FIG. 7A shows a case in which a camera focus plane is at far infinite from a camera and FIG. 7B shows a case in which the camera focus plane is about 40 cm from the camera. A PMHOE array is depicted on the upper left side of each photo and, in each photo, a position of the camera is illustrated as a filled circle.

Referring to FIGS. 7A and 7B, to confirm eyebox expansion, result images were captured by locating the camera at positions of all of the PMHOEs. Since the proposed technique is designed to have a virtual image plane at infinity, a clear virtual astronaut may be viewed in FIG. 7A in which the camera is focusing a distant plane. Due to the Maxwellian view effect by PMHOEs, clear virtual images may also be observed as shown in FIG. 7B although the result image was captured by focusing about 40 cm plane from the camera. In the right side of FIGS. 7A and 7B, experimental results from a conventional WNED are also shown for comparison with the proposed method. It is clear from the comparison in FIG. 7B that the defocus blur of the conventional WNED is removed in the proposed system due to the increased DoF. As a result, in-focused clear virtual images may be observed at each of positions of PMHOEs for different camera focus planes, which successfully demonstrates vergence-accommodation conflict (VAC) mitigation and eyebox replication of the proposed AR WNED.

Figure 8A:
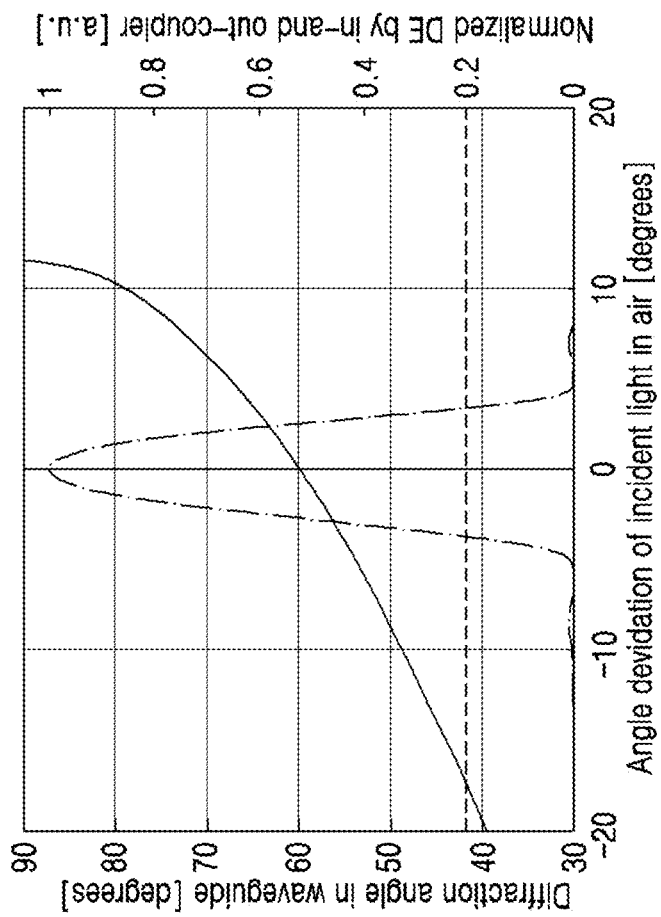
FIGS. 8A and 8B are graphs showing limitations of the proposed Maxwellian AR WNED.
Figure 8B:
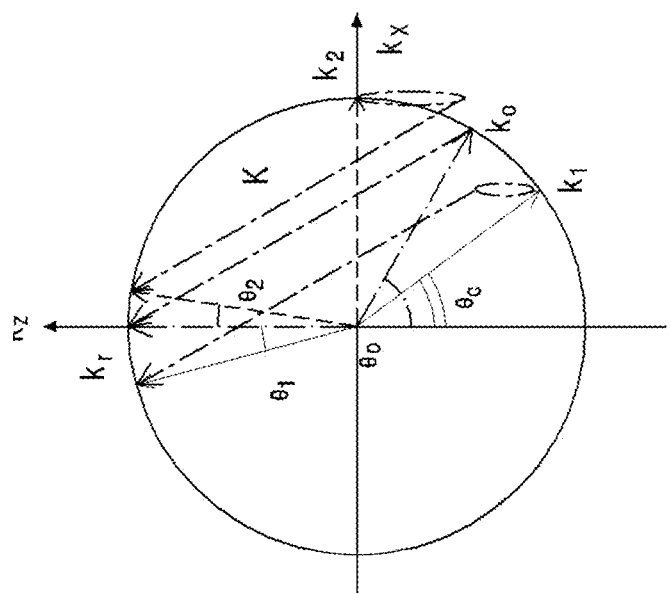

FIGS. 8A and 8B are graphs showing limitations of the proposed Maxwellian AR WNED.

As described above, although the fundamental concept of the proposed Maxwellian AR WNED is experimentally verified, there are still many points to be enhanced. A first limitation is that a virtual image plane is still at infinite plane. If this plane is located at a hyperfocal distance of the human eye, performance of a modulation transfer function of the proposed optical system may be enhanced. The virtual image plane may be located at the hyperfocal distance of the human eye by fabricating a PMHOE to have slight negative refractive power using a concave lens in a recording process. A second limitation is that a field of view (FoV) of each PMHOE is limited by angular tolerance of a holographic optical element (HOE) and a critical angle of a waveguide. FIG. 8A shows a k-vector diagram of an in-coupler HOE. In the diagram, a grating vector K is determined by subtracting an object beam k-vector k0 from reference beam k-vector kr. In a HOE fabrication process of the present invention, kr has only z-component and k0 has a diffraction angle of $\theta 0=60°$ with z-axis. If there is an angle deviation, such as $\theta 1$ and $\theta 2$, to an incident probe beam, the k-vector of the diffracted beam is also changed to k1 and k2 that may be calculated by the k-vector diagram. The calculated diffraction angle in the waveguide according to the angle deviation in the air is illustrated in FIG. 8B (solid line (-)). For total reflection of light inside the waveguide, the deviation angle in the air needs to between $\theta 1$ and $\theta 2$, making the diffraction angle larger than the critical angle $\theta c$ (dashed line (---)) and smaller than 90 degrees. As shown in FIG. 8B, a usable angle range of the incident light is calculated to be 28.88 degrees in the air. However, since the HOE has rigorous angle selectivity, a FoV of a virtual image is affected by the angular tolerance of the HOE. Based on a coupled wave theory (CWT), normalized diffraction efficiency (DE) considering in-and-out coupler is illustrated in FIG. 8B (line (-•-)). The full-width at half-maximum (FWHM) of the normalized diffraction efficiency is 5.36 degrees, which restricts the FoV of the proposed WNED. However, in the experimental results, the actual FoV of the virtual image was measured to be 9.29 degrees including a low brightness part due to small diffraction efficiency. Since this value is insufficient for immersive AR experience, FoV enhancement technique needs to be applied to the system. The use of multi-waveguide may be one approach. By fabricating several waveguides that cover different parts in the FoV, the overall FoV may be enhanced. Alternatively, a HOE multiplexing technique may be used with a single waveguide, by recording HOEs to cover different parts of a microdisplay.

FIGS. 9A-9C schematically illustrates a Maxwellian AR WNED with a multiplexed in-coupler HOE, a set of out-coupler PMHOEs, and a single waveguide according to second example embodiments.

Referring to FIGS. 9A-9C, the Maxwellian AR WNED includes a waveguide, an in-coupler HOE configured to attach to the waveguide and to guide incident light into the waveguide such that the incident light propagates in the waveguide, and a PMHOE array configured to attach to the waveguide and to diffract the light propagated in the waveguide toward a user. The in-coupler HOE includes a plurality of in-coupler HOEs configured to stack on the waveguide, for example, a first in-coupler HOE and a second in-coupler HOE. The PMHOE array includes a plurality of PMHOE groups each attached to the waveguide and arranged to be separate from each other on the waveguide, and configured to realize the Maxwellian view effect. Each of the PMHOE groups includes a plurality of PMHOEs, for example, a first PMHOE and a second PMHOE, configured to diffract light diffracted from the plurality of in-coupler HOEs and propagated in the waveguide toward the user eye.

For example, the first in-coupler HOE and the second in-coupler HOE have grating vectors Ki1/Ki2 by using ki1,r/ki2,r as reference beams and using ki1,o/ki2,o as object beams. The first in-coupler HOE and the second in-coupler HOE may be simultaneously recorded in a single recording medium (photopolymer or silver halide) and may be implemented by physically stacking a plurality of HOEs already recorded. The first in-coupler HOE guides light from a right area of microdisplay at a small angle, for example, 45 degrees in the waveguide by angular selectivity of an HOE (volume grating). The second in-coupler HOE guides light from a left area of the microdisplay at a large angle, for example, 60 degrees in the waveguide. The first PMHOE and the second pin-mirror HOE have grating vectors Ko1/Ko2 by using ko1,r/ko2,r as references and using ko1,o/ko2,o as objects. Here, the first PMHOE and the second PMHOE need to be separate from each other and present at spatially different positions.

As a result, each PMHOE group is recorded to cover some areas of the microdisplay and provides an image to the eye. In the case of using n PMHOE groups, FoV may be magnified by n times.

FIGS. 10A-10C schematically illustrates a Maxwellian AR NED with a multiplexed PMHOE and a multiplexed waveguide according to third example embodiments.

Referring to FIGS. 10A-10C, the Maxwellian AR WNED includes a plurality of waveguides, an in-coupler HOE configured to attach to the waveguides and to guide incident light into the waveguides such that the incident light propagates in the waveguides, and a PMHOE array configured to attach to the waveguides and to diffract light propagated in the waveguides toward a user. The in-coupler HOE includes a plurality of in-coupler HOEs configured to attach to the waveguides, respectively. The PMHOE array includes a plurality of PMHOE groups each attached to the waveguides and arranged to be separate from each other on the waveguides, and configured to realize the Maxwellian view effect. Each of the PMHOE groups includes a plurality of PMHOEs configured to attach to the waveguides, respectively.

For example, the plurality of in-coupler HOEs have grating vectors Ki1/Ki2/Ki3 by using ki1,r/ki2,r/ki3,r as reference beams and using ki,o as an object beam. The plurality of in-coupler HOEs guide light from corresponding areas (right/middle/left in FIG. 10A) of a microdisplay at the same angle in each of the waveguides by angular selectivity of HOE (volume grating). The plurality of PMHOEs have grating vectors Ko1/Ko2/Ko3 by using ko,r as reference and using ko1,o/ko2,2/ko3,o as object.

As a result, each PMHOE group is recorded to cover some areas of the microdisplay along with the waveguides and provide an image to the eye. In the case of using n PMHOE groups and n waveguides, FoV may be magnified by n times.

As described above, various example embodiments provide a waveguide-type see-through Maxwellian near-eye display with an enlarged eyebox using a PMHOE array.

A waveguide-type see-through Maxwellian near-eye display according to various example embodiments includes a waveguide; and a pin-mirror holographic optical element (PMHOE) array configured to attach to the waveguide and to diffract light propagated in the waveguide toward a user.

According to various example embodiments, the waveguide-type see-through Maxwellian near-eye display further includes an in-coupler holographic optical element (HOE)

configured to attach to the waveguide and to guide incident light into the waveguide such that the incident light propagates in the waveguide.

According to various example embodiments, the PMHOE array includes a plurality of PMHOEs each attached to the waveguide and arranged to be separate from each other on the waveguide, and configured to realize the Maxwellian view effect.

According to various example embodiments, the PMHOEs have individual eyeboxes, respectively, and the PMHOE array has an extended eyebox in which the individual eyeboxes are integrated.

According to various example embodiments, a diameter of each of the PMHOEs is determined considering a modulation transfer function (MTF) achieved by the PMHOEs and a change of the modulation transfer function at different eye focal distances.

According to various example embodiments, the diameter of each of the PMHOEs is greater than 0.5 mm and less than 2.0 mm.

According to an example embodiment, the diameter of each of the PMHOEs is 1.0 mm.

According to various example embodiments, a gap between the PMHOEs is determined to maintain the Maxwellian view effect of each of the PMHOEs.

According to various example embodiments, the gap between the PMHOEs is 5 mm.

According to various example embodiments, the see-through Maxwellian near-eye display is used for augmented reality application.

According to an example embodiment, the in-coupler HOE includes a plurality of in-coupler HOEs configured to stack on the waveguide, the PMHOE array includes a plurality of PMHOE groups attached to the waveguide and arranged to be separate from each other on the waveguide, and each of the plurality of PMHOE groups includes a plurality of PMHOEs corresponding to the plurality of in-coupler HOEs, respectively, and arranged to be separate from each other on the waveguide.

According to another example embodiment, the waveguide includes a plurality of waveguides arranged in parallel, the in-coupler HOE includes a plurality of in-coupler HOEs attached to the plurality of waveguides, the PMHOE array includes a plurality of PMHOE groups attached to the plurality of waveguides and arranged to be separate from each other on the plurality of waveguides, and each of the plurality of PMHOE groups includes a plurality of PMHOEs attached to the plurality of waveguides, respectively, and corresponding to the plurality of in-coupler HOEs, respectively.

Various example embodiments and the terms used herein are not construed to limit description disclosed herein to a specific implementation and should be understood to include various modifications, equivalents, and/or substitutions of a corresponding example embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., a first component) is described to be "(functionally or communicatively) connected to" or "accessed to" another component (e.g., a second component), the component may be directly connected to the other component or may be connected through still another component (e.g., a third component).

According to various example embodiments, each of the aforementioned components may include a singular object or a plurality of objects. According to various example embodiments, among the aforementioned components, one or more components or operations may be omitted or one or more other components or operations may be added. Alternatively or additionally, a plurality of components may be integrated into a single component. In this case, the integrated component may perform one or more functions of each of the components in the same or similar manner as it is performed by a corresponding component before integration.

The invention claimed is:

1. A waveguide-type see-through Maxwellian near-eye display, comprising:
   a waveguide; and
   a pin-mirror holographic optical element (PMHOE) array configured to attach to the waveguide and to diffract light propagated in the waveguide toward a user,
   wherein the PMHOE array includes a plurality of PMHOEs each attached to the waveguide and arranged to be separate from each other on the waveguide, and configured to realize the Maxwellian view effect,
   wherein the PMHOEs have individual eyeboxes, respectively, and
   wherein the PMHOE array has an extended eyebox in which the individual eyeboxes are integrated.

2. The waveguide-type see-through Maxwellian near-eye display of claim 1, further comprising:
   an in-coupler holographic optical element (HOE) configured to attach to the waveguide and to guide incident light into the waveguide such that the incident light propagates in the waveguide.

3. A waveguide-type see-through Maxwellian near-eye display, comprising:
   a waveguide; and
   a pin-mirror holographic optical element (PMHOE) array configured to attach to the waveguide and to diffract light propagated in the waveguide toward a user,
   wherein the PMHOE array includes a plurality of PMHOEs each attached to the waveguide and arranged to be separate from each other on the waveguide, and configured to realize the Maxwellian view effect, and
   wherein a diameter of each of the PMHOEs is determined considering a modulation transfer function (MTF) achieved by the PMHOEs and a change of the modulation transfer function at different eye focal distances.

4. The waveguide-type see-through Maxwellian near-eye display of claim 3, wherein the diameter of each of the PMHOEs is greater than 0.5 mm and less than 2.0 mm.

5. The waveguide-type see-through Maxwellian near-eye display of claim 4, wherein the diameter of each of the PMHOEs is 1.0 mm.

6. A waveguide-type see-through Maxwellian near-eye display, comprising:
   a waveguide; and
   a pin-mirror holographic optical element (PMHOE) array configured to attach to the waveguide and to diffract light propagated in the waveguide toward a user,
   wherein the PMHOE array includes a plurality of PMHOEs each attached to the waveguide and arranged to be separate from each other on the waveguide, and configured to realize the Maxwellian view effect, and wherein a gap between the PMHOEs is determined to maintain the Maxwellian view effect of each of the PMHOEs.

7. The waveguide-type see-through Maxwellian near-eye display of claim 6, wherein the gap between the PMHOEs is 5 mm.

8. The waveguide-type see-through Maxwellian near-eye display of claim 6, wherein the see-through Maxwellian near-eye display is used for augmented reality application.

9. The waveguide-type see-through Maxwellian near-eye display of claim 6, wherein the in-coupler HOE includes a plurality of in-coupler HOEs configured to stack on the waveguide, the PMHOE array includes a plurality of PMHOE groups attached to the waveguide and arranged to be separate from each other on the waveguide, and each of the plurality of PMHOE groups includes a plurality of PMHOEs corresponding to the plurality of in-coupler HOEs, respectively, and arranged to be separate from each other on the waveguide.

10. The waveguide-type see-through Maxwellian near-eye display of claim 6, wherein the waveguide includes a plurality of waveguides arranged in parallel, the in-coupler HOE includes a plurality of in-coupler HOEs configured to attach to the plurality of waveguides, respectively, the PMHOE array includes a plurality of PMHOE groups attached to the plurality of waveguides and arranged to be separate from each other on the plurality of waveguides, and each of the plurality of PMHOE groups includes a plurality of PMHOEs attached to the plurality of waveguides, respectively, and corresponding to the plurality of in-coupler HOEs, respectively.

* * * * *